(No Model.) 8 Sheets—Sheet 6.
H. FLAD.
METHOD OF INDICATING THE VELOCITY OF RUNNING FLUIDS.
No. 417,318. Patented Dec. 17, 1889.

Fig. 19

(No Model.) 8 Sheets—Sheet 8.

H. FLAD.
METHOD OF INDICATING THE VELOCITY OF RUNNING FLUIDS.

No. 417,318. Patented Dec. 17, 1889.

UNITED STATES PATENT OFFICE.

HENRY FLAD, OF ST. LOUIS, MISSOURI.

METHOD OF INDICATING THE VELOCITY OF RUNNING FLUIDS.

SPECIFICATION forming part of Letters Patent No. 417,318, dated December 17, 1889.

Application filed July 12, 1889. Serial No. 317,292. (No model.)

*To all whom it may concern:*

Be it known that I, HENRY FLAD, of St. Louis, in the State of Missouri, have invented certain new and useful Improvements in the Method of Indicating the Velocity of Running Fluids; and I do hereby declare the following to be a full, clear, and exact description of the invention, such as will enable others skilled in the art to which it appertains to make and use the same.

My invention relates to the method of indicating the velocity of running fluids.

The method consists in utilizing the two forces—that is, the impact and draft or suction—of a running fluid so as to cause two columns of fluid to be respectively acted upon simultaneously by this impact and suction of the stream upon the ends of said columns, whereby the fluctuations in height of an interposed fluid of different specific gravity from the columns of fluid caused by the varying impact and suction, due to the varying velocity of the passing stream, is recorded upon a sheet of sensitized paper by the action of a ray of light upon the interposed fluid.

In the accompanying drawings, Fig. 11 is an enlarged broken sectional view of the revolving cylinder and its box. Fig. 13 is an enlarged plan view of the cylinder and clock-work box. Figs. 14, 14ª, and 15 are details. Figs. 20ª and 21ª show a device in which a light and a heavy liquid are used.

Before entering into a detailed description of the parts a brief statement of the principle will be appropriate.

Figure 20:
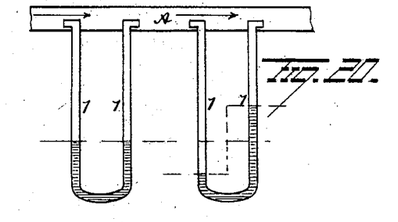
Figs. 20 and 21 are modifications showing, respectively, the devices used with a light and a heavy fluid.
Figure 20A:
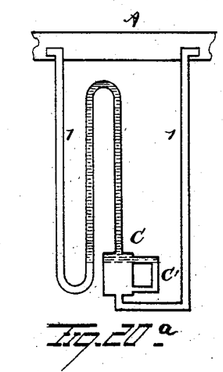
Figure 21:
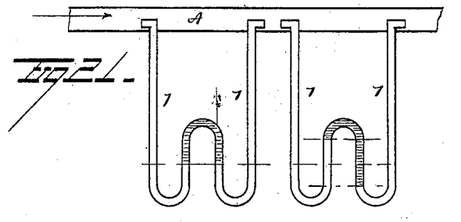
Figure 21A:
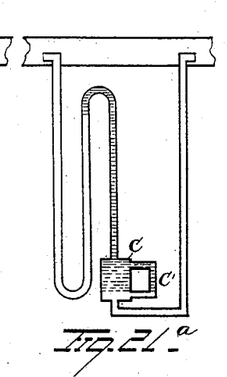

Although the velocimeter could easily be modified to measure the velocity of currents in either direction, yet I will assume that the flow of the water in the main is always in the same direction and that the velocimeter will be placed far enough below and away from the main so that no heat can be communicated to the instrument proper. The fluid interposed between the columns of water may be lighter or heavier than water, but it must not mix with the latter. As will be seen a little later on, it is also feasible to employ two interposed fluids, one of which shall be heavier than water and the other lighter than water. The simplest form of instrument to illustrate the operation of the velocimeter is shown in Figs. 20 and 21. In the former a fluid heavier than water is interposed between the columns of water, while in the latter a fluid lighter than water is employed, it being located normally in the central siphon-tube. The water in the main above, into which the tubes 1 open, is represented as being at rest in the left-hand portion of each of these figures and in the right-hand side as being displaced by the combined impact and suction in the other. As the velocity of the stream in the main increases of course the more the interposed fluid (represented by shaded lines) is displaced, and, on the other hand, the less the velocity the less is the interposed fluid displaced.

Figure 22:
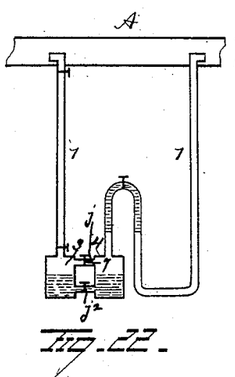
Fig. 22 illustrates still another form.
Figure 23:
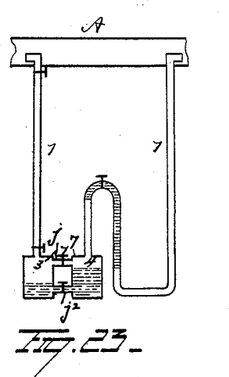
Fig. 23 is a modification showing means for preventing the oil from being driven out by the force exerted upon the water.
Figure 24:
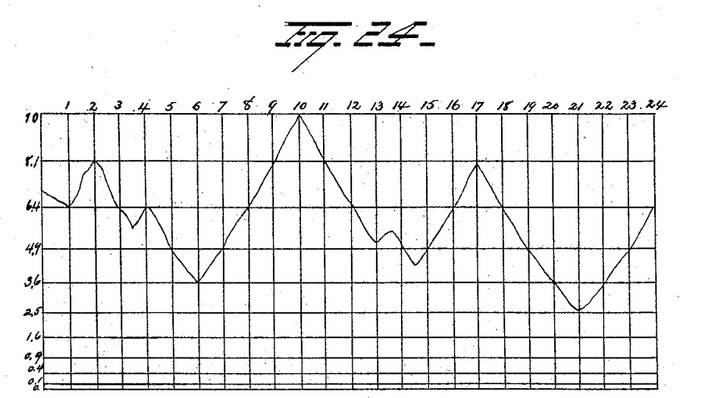
Fig. 24 shows a diagram developed for twenty-four hours.

It is now important to accurately prepare a scale or diagram by precise mathematical calculations which shall represent the velocity necessary to cause the interposed fluid to rise to certain heights, and also such velocity as will allow it to drop; and, although it is unnecessary to explain how all these equations are arrived at here, I have prepared these formulæ and applied the results to the diagram shown in Fig. 24. The problem which now presents itself is: How is the fluctuation in height of this interposed fluid to be recorded upon this diagram? and my present invention consists, primarily, in photographing or printing, as it were, an exact diagram of these fluctuations upon the prepared scale; but before entering into an explanation of the instrument and its modifications which accomplish this result one point more in explanation of the principle is opportune. It is impossible to find fluids which would have exactly the specific gravities required for a particular velocity besides fulfilling the other conditions necessary—namely, that the interposed fluids must not mix with or dissolve in water, that it must possess great fluidity and velocity, and should not adhere to the sides of the glass tubes in which the height of columns prevailing at different velocities is to be observed. In my experiments I have found but three fluids which give satisfaction—viz., naphtha, oil of turpentine, and oil of cajeput. To be sure, there are a number of essential oils—such as oil of sassafras, cinnamon, cassia, and the like—of a specific gravity, but slightly exceeding the specific gravity of water, which might answer, but these have been tried with unsatisfactory results, so that the three above mentioned are principally relied upon. Of fluids heavier than water mercury alone has proven satisfactory. So in Figs. 20 and 21, already referred to, mercury and naphtha are employed, respectively; but when mercury alone is used the fluctuations are very slight. A velocity of ten feet per second would produce a difference in height of column of only 2.62 inches, and if, as previously hinted at, only the rise and fall in one of the tubes of the velocimeter were to be recorded by rays of light acting on sensitized paper, as will be explained, the diagram would not exceed 1.311 inch in height. On the other hand, the naphtha-velocimeter, or the one having an interposed fluid lighter than water—such as oil of cajeput—would require glass tubes and recording-cylinders respectively fifty-five inches and three hundred and thirty inches in height, and the total height of the tubes would therefore have to be twice as high, or, respectively, one hundred and ten and six hundred and sixty inches; but this is impractical, and it is desirable to so arrange the tubes and fluids that the diagram employed need not be more than ten inches in height for a velocity of ten feet per second. The above condition would only be satisfied if a liquid could be used of a specific gravity of 2.651, which would also possess all the other qualities heretofore mentioned. Heretofore in the form of velocimeter described the water-tubes and recording-tubes have been of the same sectional area; but it is always possible to reduce the height of the columns from which the record is to be taken, and consequently the height of the registering-cylinder and of the diagram, to any desired height by giving to the registering-tube, or at least that portion of it which will be reached by the liquid (lighter than water) while the velocity of the hot water in the main increases from naught to ten feet per second, a larger sectional area than the other tube. For instance, in Figs. 20ª and 21ª the cylinder C could not well be made of glass, and if it could be made of glass would, on account of its large diameter, prevent the passage of a ray of light; but a glass tube C' is placed alongside and some distance from the cylinder C. All of the other parts are of metal. The record is taken from this tube; but the tubes 1 in this instance have to extend vertically about one hundred and ten inches between the main and the instrument proper. When this is objectionable, different fluids may be used—mercury for one and the other naphtha—that is, one heavy and the other light. By this arrangement the tubes 1 need only be twice the length of the glass recording-tube. The use of the heavy and the light fluid is demonstrated by Figs. 22 and 23. The former shows the position when the water in the main is at rest and the latter when the water in the main is in motion. In this form the tubes 1 are the same as before, and naphtha is used in the siphon and glass tube 2, but mercury is used in the cylinders 3 and 4. These cylinders are connected by glass tubes $j'$ and $j^2$, the upper of which has a cock 7, which, when the water in the main is at rest, is kept open; but as soon as the water moves, this cock 7 is closed and the pressure is exerted on the left-hand column or cylinder of mercury, as indicated in Fig. 23. This pressure displaces the mercury, as indicated, the latter displaces the water above it and between it and the naphtha, and the naphtha fluctuates in the glass tube from which the record is made.

So much will suffice for the principle of the instrument, and it is intended to render the following description more comprehensive.

A represents the main. This is preferably about four feet in length and as many inches inside diameter. This main should be made of cast-iron bored out to a uniform diameter, and, as shown in the drawings, is provided with flanges $a$ at the ends. A short distance from the ends of this main ferrules $b$ are secured into the latter. These ferrules are so arranged that the bent tubes can be withdrawn from the main for inspection or repairs without allowing any of the hot water to escape from the main and without emptying it. Cylindrical boxes B slide into these ferrules and are held therein by means of clamp-screws $d$. These boxes have a stuffing-box $e$ at one end and a screw-follower $e'$ for tightening the latter, and in each box B a tube 1 is guided by means of the collars $f$. The tubes are of metal, and at the extreme upper end are bent at right angles. A small flat plate $f''$ is affixed to each cylindrical box below the stuffing-boxes. Said plates are set exactly parallel to the bent end of the tubes 1. Their use is for placing the tubes 1 in the proper direction parallel to the center line of the main before being permanently fastened therein by means of the stuffing-boxes. When the tubes 1 are for any reason to be withdrawn from the main, they are first lowered (after the stuffing-box has been slightly relieved) until the bent ends touch the upper ends of the cylindrical boxes, the cocks $q$ in the pipes having been previously closed and the couplings $h$ having been disconnected. The cylindrical boxes may then be withdrawn until they clear the cocks D in the ferrules, in which position they are held by a small chain or other means (not shown) until the cock D has been closed. Then the pipes may be removed with facility without allowing any water to escape from the main. When the pipes are to be again introduced into the main, they are applied in reverse order. The brass tubes 1 have a bend 12 just below the coupling $h$ to prevent strains arising from changes in temperature.

Figures 1, 2, 3, 4, 5:
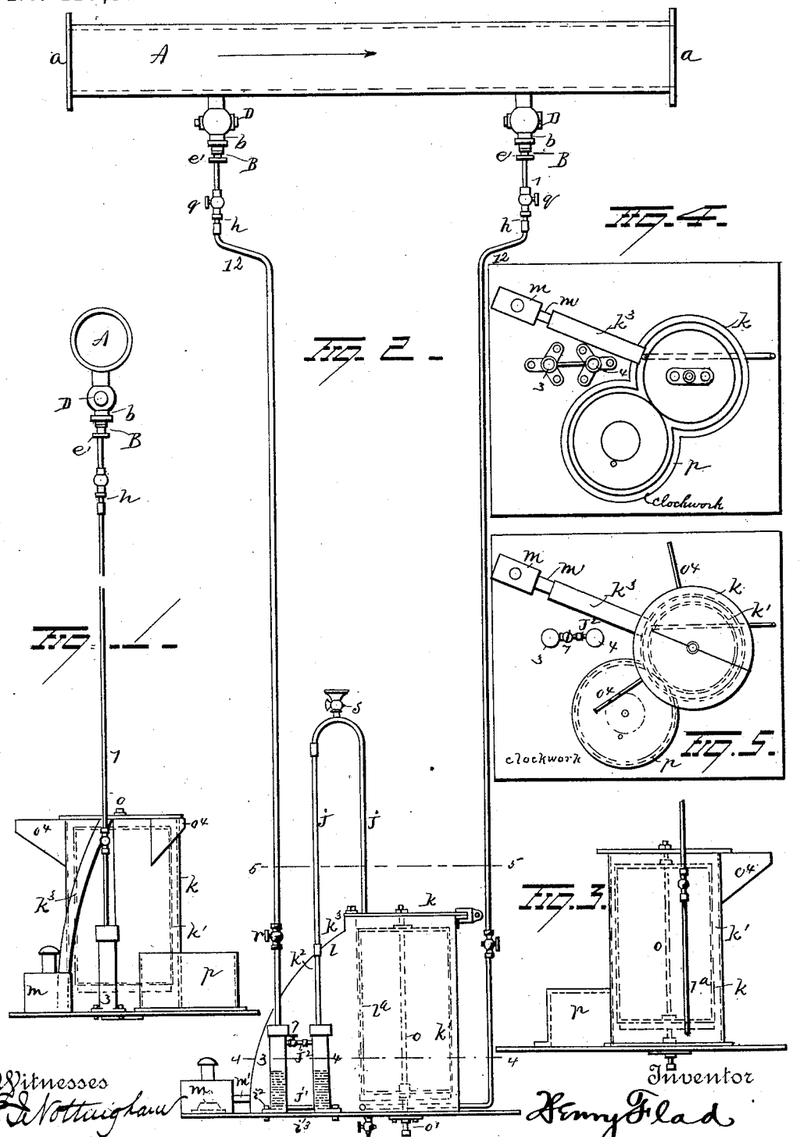
Figure 1 is a front view of one practical form of apparatus employed.
Fig. 2 is a side view of the same.
Fig. 3 is a rear elevation.
Fig. 4 is a sectional view on the line 4 4 of Fig. 2.
Fig. 5 is a plan view taken on the line 5 5 of Fig. 2.
Figures 6, 8:
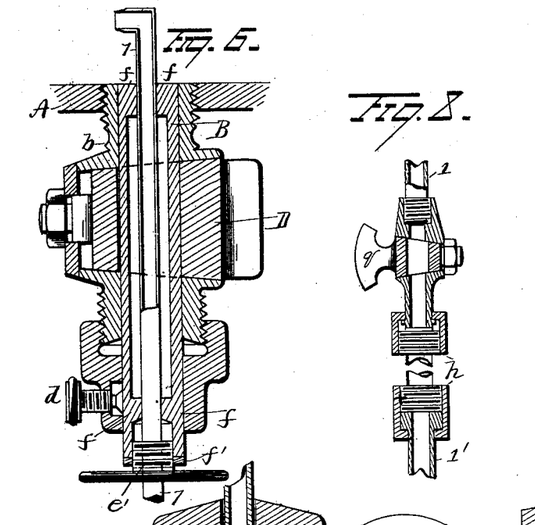
Fig. 6 is a sectional view of the ferrule connecting the vertical pipes to the main.
Fig. 8 is a detail view of a form of pipe-coupling used.
Figure 7:
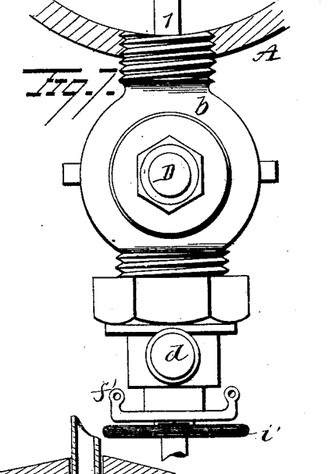
Fig. 7 is an elevation of the same.
Figure 9:
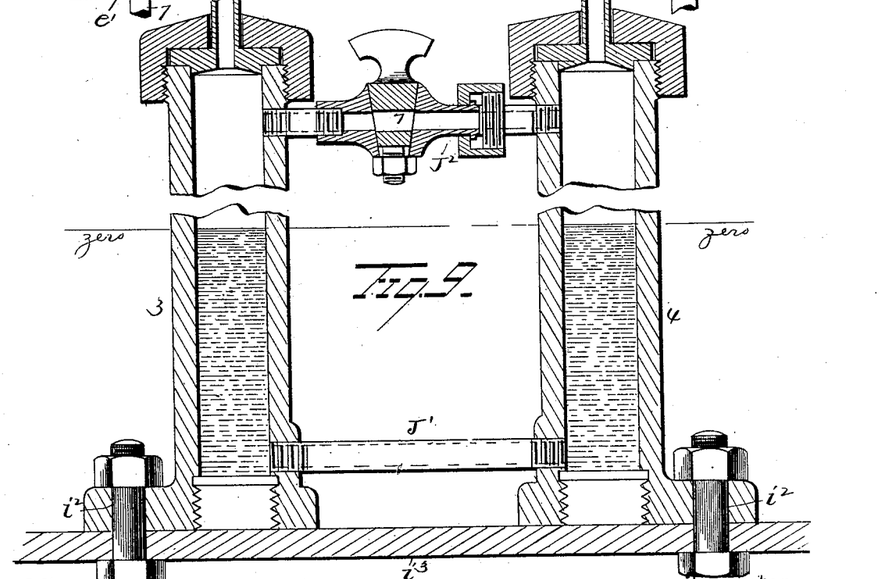
Fig. 9 is a sectional view through the mercury-cylinders.
Figure 10:
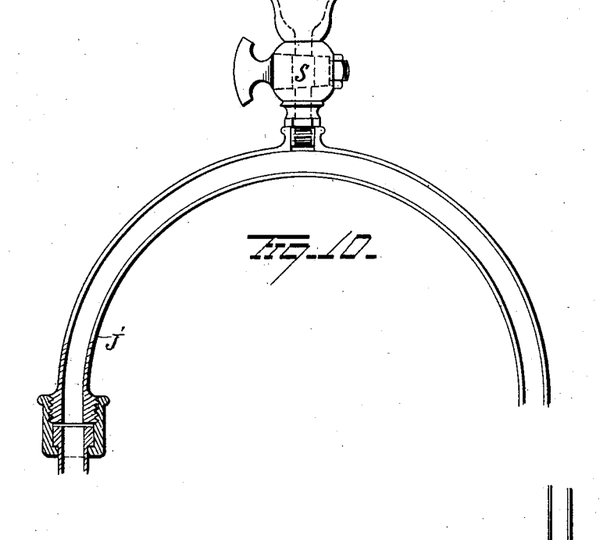
Fig. 10 is a detail of the siphon-tube.
Figures 11, 14, 14A, 15:
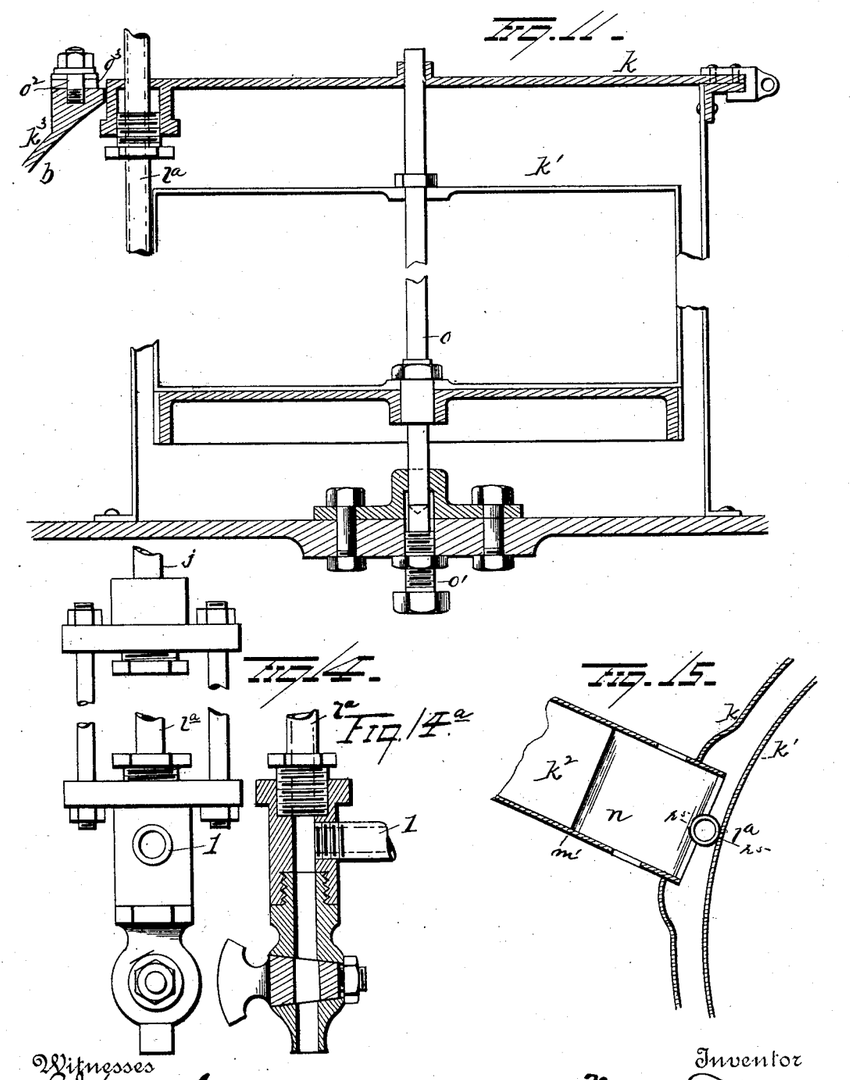
Figure 12:
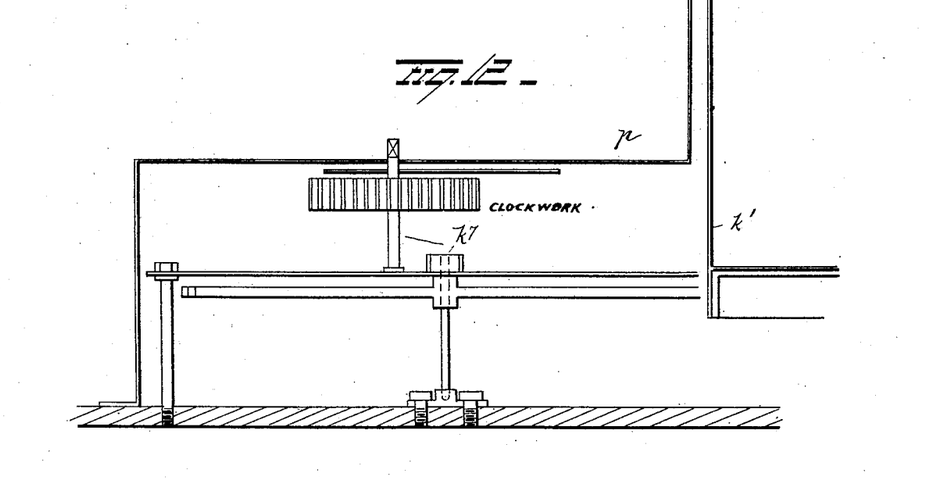
Fig. 12 is a sectional view through the clock-box.

A pair of cast-iron cylinders 3 4 are secured by bolts $i^2$ to the brass base-plate $i^3$. These cylinders are both bored out to exactly the same diameter throughout their entire length, and one of the tubes 1 enters the top of cylinder 3, while one end of siphon-tube $j$ extends out of the top of the other cylinder 4. The two cast-iron cylinders are connected by two glass tubes $j'$ $j^2$, one at the bottom and the other at the top, and the latter is provided with a cock 7, whereby it may be opened while the water in the main A is at rest and closed when it is in motion. These cylinders are preferably nickel-plated inside to prevent corrosion when the mercury is placed therein. The box $k$, in which the revolving cylinder $k'$ is placed, is also bolted or otherwise secured to the brass plate. One portion of this box is cylindrical in shape, as shown in Figs. 4 and 5, to receive the silvered copper or brass recording-cylinder, and the other portion $k^2$ is narrow, having a curved back $k^3$, in which there is a parabolic mirror $l$, adapted to reflect and concentrate the light thrown thereon, as shown in Fig. 2. The portion of the siphon-tube $j$ in the box $k$ is glass, and is designated a "recording-tube" $l^x$, and one of the tubes 1 is connected with the lower end of this tube. The recording-tube is covered with tin-foil, into which two narrow slots $p^5$ (see Fig. 18) are cut opposite each other, so that the horizontal rays of light reflected by the parabolic mirror, after passing through the slots in the glass tube and the water contained therein, can act upon the sensitized paper with which the recording-cylinder is lined. The light for accomplishing this is contained in a lamp-box $m$ off to one side, and a tube $m'$ connects this lamp-box with the recording-cylinder box. A glass lens $n$ at the end of this tube $m'$ concentrates the rays of light on the recording-cylinder as the latter revolves, and this cylinder reflects the light back to the parabolic mirror, whence it is again reflected by the latter in a horizontal direction upon the glass recording-tube. The location of this tube is contiguous to the revolving cylinder, so that the light passing through it is recorded upon the diagram shown in Fig. 24. In this diagram the column of figures on the left represents the number of feet of water per second passed, and the numbers over the top represent the twenty-four hours of a day. The cylinder revolves once during twenty-four hours, and the irregular line indicates the record of velocity. The recording-cylinder is journaled on an axis $o$, and the lower end of this is stepped in an adjustable screw $o'$, whereby the cylinder may be elevated or lowered, in order that the diagram may be in the right place relative to the recording glass tube. The cover of the box $k$ is made in halves, each of which is pivoted upon a post $o^2$ and provided with a half-bearing $O^3$ in the center, which, when the half-covers are closed over the cylinder, forms a bearing and lateral support for the upper end of the axis. When these half-covers are open, they rest on brackets $o^4$. Box $p$, immediately adjacent to box $k$, contains clock-work $k^7$ or similar mechanism for actuating the recording-cylinder. A number of cocks $q$, $r$, $s$, and $t$ in the tubes are manipulated when the different parts of the instrument are charged with the fluids.

Figures 16, 17:
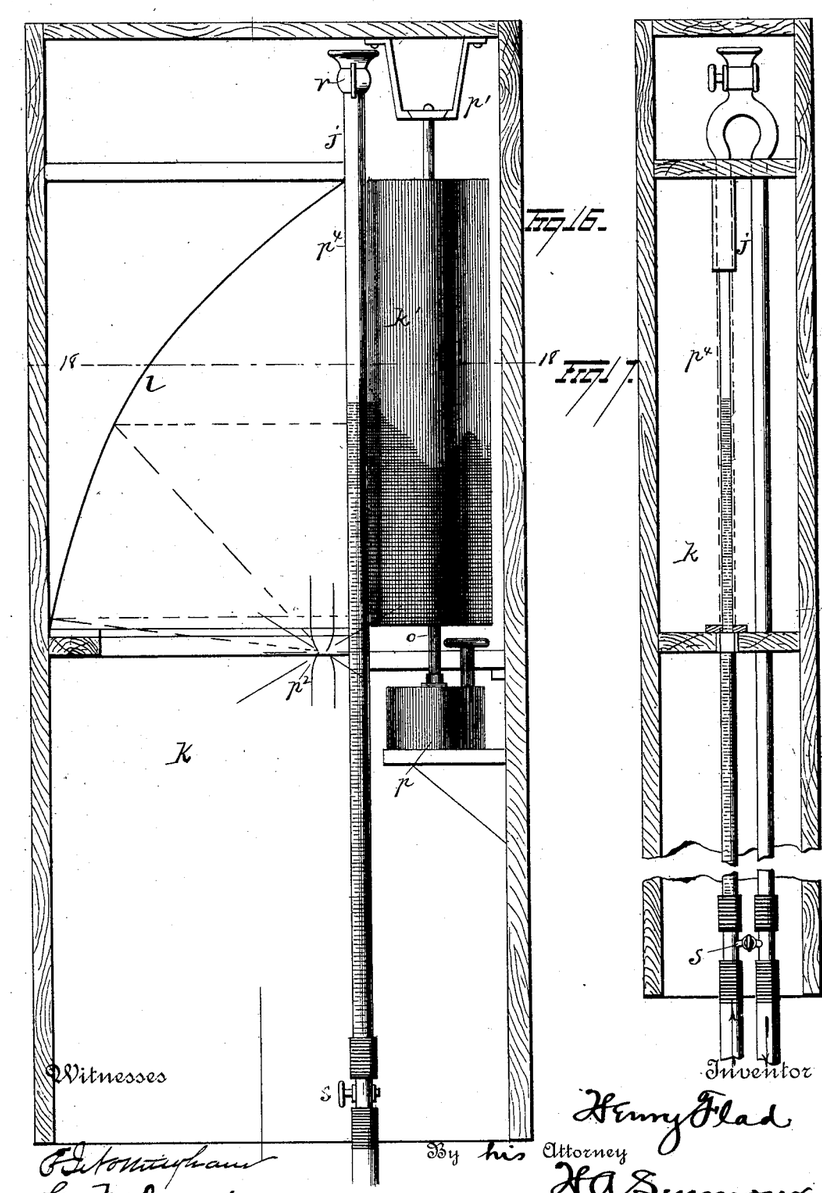
Fig. 16 is an elevation of a modified form of velocimeter, partly in section.
Fig. 17 is a vertical view, partly in section, taken at right angles thereto.
Figures 18, 19:
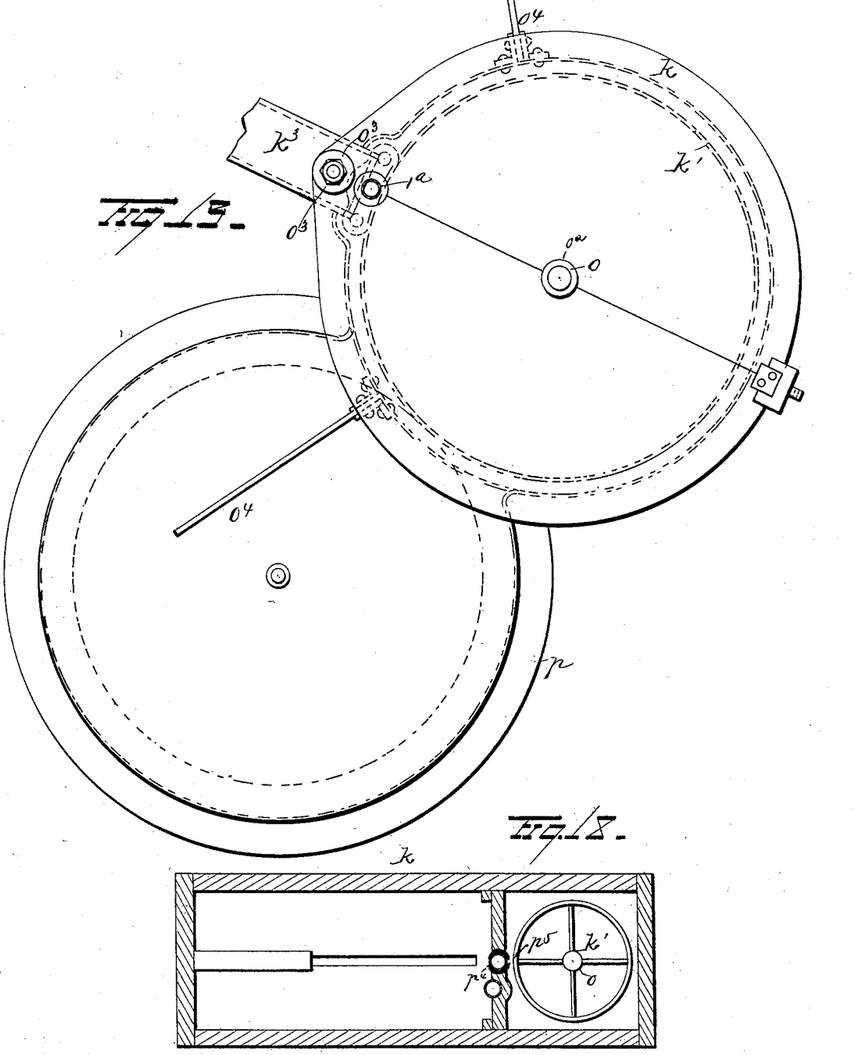
Fig. 18 is a horizontal section on line 18 18 of Fig. 16.
Fig. 19 is a view of the automatic regulator.
Figure 19:
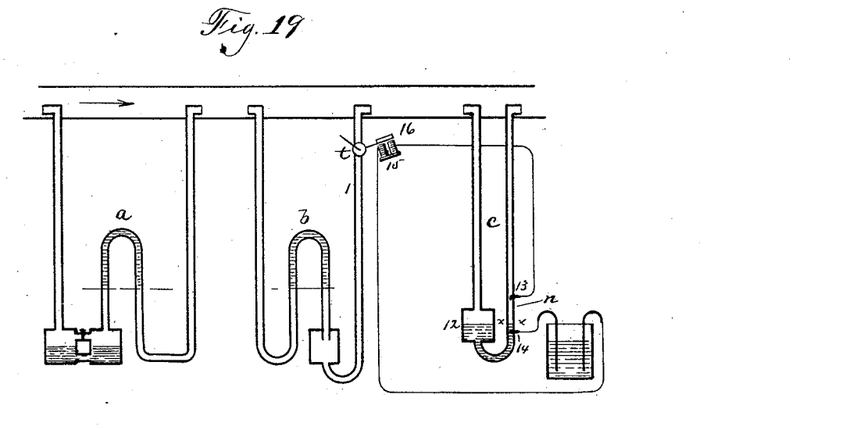

In Fig. 16 a modification is shown, and in Figs. 17 and 18 different views of this modification are shown. In this construction $k$ represents the box, in one compartment of which the cylinder $k'$ is located. The axis $o$ of this cylinder is journaled at the lower end in clock-box $p$, where it is actuated by suitable clock-work. The upper end is supported by hanger $p'$. The siphon-tube $j$ extends along in close proximity to the cylinder, one branch or leg being on the opposite side of the cylinder, and the other, composed of glass, in an opening in the partition. This tube is covered with tin-foil $p^4$, and a narrow slot $p^5$ (see Fig. 18) is formed in this tin-foil next to the cylinder. A parabolic mirror $l$ is located in the rear of the cylinder-box, and onto this mirror light radiates from the carbon points $p^2$, as indicated by the dotted lines, and thence it is reflected back in a horizontal line through the glass tube to the cylinder. Now, as the naphtha in the tube fluctuates, an impression is made, as before, upon the sensitive paper lining the recording-cylinder. By means of the cocks $r$ and $s$ the siphon-tube is filled or emptied.

It is clear that if the velocity in the main rises above a certain number of feet per second the oil or light fluid will all be driven into the glass recording-tube, and that some of it will be driven into tube 1 when the water begins to flow through the tubes. To prevent such an occurrence, it is necessary to stop the water from flowing through the tubes by closing a cock in one of the tubes 1. This cock may be manipulated by an attendant, if the time at which the change in velocities is to occur is previously known. It can be done automatically by adding a third velocimeter and arranging the three as shown in Fig. 19 at $a$, $b$, and $c$. In this figure velocimeter $a$ is filled with mercury and naphtha, $b$ with oil of cajeput, and $c$ with mercury. All three of these are shown as they appear when the water in the main is at rest. The cylinder 12 in velocimeter $c$ has a diameter ten times greater than the diameter of the glass recording-tube $l^a$, and therefore a sectional area one hundred times greater. In the glass tube two copper wires are fixed, one 13 with a point bent downward, so that the point is within a fraction of an inch of the mercury or above line $x\,x$ when the water in the main is at rest, and the other 14 about an inch above the lower end of the glass tube, so as to reach into the mercury. An electro-magnet 15 is fixed near the cock $t$ in tube 1. The copper wire 13 in the glass tube above line $x\,x$ is connected with the electro-magnet 15, thence leading to a galvanic battery, while the other pole of the battery is connected by a copper wire with the wire 14 in the glass tube. The cock $t$ is open when there is no flow, and the armature 16 is off the magnet as long as the ends of the wires 13 and 14 are brought into electrical contact; but when the water in the main begins to flow the mercury in the cylinder will be depressed and the column in the tube will rise. When this mercury rises high enough to touch the wire 13, the circuit is closed, the armature is attracted by the electro-magnet, and the armature closes cock $t$.

It is evident that slight changes might be resorted to in the form and arrangement of the several parts described without departing from the spirit and scope of my invention. Hence I do not wish to limit myself to the particular construction herein set forth; but, Having fully described my invention, what I claim as new, and desire to secure by Letters Patent, is—

1. The herein-described method of indicating the velocity of running fluids, the same consisting in recording the fluctuations of a fluid of different specific gravity operated upon by the passing fluid by the action of a ray of light upon said fluid of different specific gravity, substantially as set forth.

2. The herein-described method of indicating the velocity of running fluids, the same consisting in causing two columns of the fluid to be respectively acted upon simultaneously by the impact and suction or draft of the stream and recording the fluctuations of an interposed fluid of different specific gravity by the action of a ray of light on said interposed fluid, substantially as set forth.

3. The herein-described method of indicating the velocity of running fluids, the same consisting in causing two columns of the fluid to be respectively acted upon simultaneously by the impact and suction or draft of the stream, said columns being connected by two interposed fluids, one of which is heavier than the fluid in the columns and the other lighter, whereby the combined effects of impact and suction are applied to effect a displacement of the interposed light medium, substantially as set forth.

4. The herein-described method of indicating the velocity of running fluids, the same consisting in causing two columns of the fluid to be respectively acted upon simultaneously by the impact and suction or draft of the stream, said columns being connected by two interposed fluids, one of which is heavier than the fluid in the columns and the other lighter, whereby the combined effects of impact and suction are applied to effect a displacement of the interposed lighter medium and record the fluctuations of the lighter fluid by the action of a ray of light thereon, substantially as set forth.

5. The herein-described method of indicating the velocity of running fluids, the same consisting in recording the fluctuations of a fluid of different specific gravity operated upon by the passing fluid by the action of a ray of light reflected by a parabolic mirror against said fluid of different specific gravity, substantially as set forth.

6. The herein-described method of indicating the velocity of running fluids, the same consisting in causing two columns of the fluid to be respectively acted upon simultaneously by the impact and suction or draft of the stream and recording the fluctuations of an interposed fluid of different specific gravity by the action of a ray of light reflected from a parabolic mirror through said interposed fluid upon a revolving scaled diagram of sensitized paper, substantially as set forth.

In testimony whereof I have signed this specification in the presence of two subscribing witnesses.

HENRY FLAD.

Witnesses:
WM. WISE,
EMORY S. FOSTER.